(12) United States Patent
Sun et al.

(10) Patent No.: US 11,940,268 B2
(45) Date of Patent: Mar. 26, 2024

(54) CONTACT ANGLE MEASURING DEVICE

(71) Applicants: Xiamen University of Technology, Xiamen (CN); Riccino (Xiamen) Optical Inc., Fujian (CN)

(72) Inventors: Dong Sun, Xiamen (CN); Luming Song, Xiamen (CN); Xianjian Zhou, Xiamen (CN); Hongyi Lin, Xiamen (CN); Hong Liu, Xiamen (CN); Wenzhang Zhu, Xiamen (CN); Haijun Lin, Xiamen (CN)

(73) Assignees: Xiamen University of Technology, Xiamen (CN); Riccino (Xiamen) Optical Inc., Fujian (CN)

( * ) Notice: Subject to any disclaimer, the term of this patent is extended or adjusted under 35 U.S.C. 154(b) by 13 days.

(21) Appl. No.: 17/738,452

(22) Filed: May 6, 2022

(65) Prior Publication Data

US 2022/0364854 A1   Nov. 17, 2022

(30) Foreign Application Priority Data

May 11, 2021 (CN) .......................... 202110508411.1

(51) Int. Cl.
*G01B 11/26* (2006.01)

(52) U.S. Cl.
CPC .................................. *G01B 11/26* (2013.01)

(58) Field of Classification Search
CPC ........... G01B 11/26; G01N 2013/0208; G01N 2013/0266; G01N 13/02
See application file for complete search history.

(56) References Cited

U.S. PATENT DOCUMENTS

| | | | | |
|---|---|---|---|---|
| 5,815,256 A | * | 9/1998 | Fukunaga | .............. G01N 13/02 356/138 |
| 2004/0144175 A1 | * | 7/2004 | Sinha | .................. G01N 29/036 73/579 |

(Continued)

FOREIGN PATENT DOCUMENTS

| | | |
|---|---|---|
| CN | 102507390 A | 6/2012 |
| CN | 102507391 A | 6/2012 |

(Continued)

OTHER PUBLICATIONS

Xue, J., Shi, P., Zhu, L., Ding, J., Chen, Q. and Wang, Q., 2014. A modified captive bubble method for determining advancing and receding contact angles. Applied surface science, 296, pp. 133-139. (Year: 2014).*

*Primary Examiner* — Edmond C Lau
*Assistant Examiner* — Mohamed Doumbia
(74) *Attorney, Agent, or Firm* — Cooper Legal Group, LLC

(57) ABSTRACT

The present disclosure discloses a contact angle measuring device, including a light source, a container, a photodetector, a bubble generating unit, and a processing unit. The container includes a first and a second side walls that are opposite. The first side wall is made of a light-transmitting material, the container is filled with a liquid with light transmission inside. The monochromatic light emitted by the light source passes through the first side wall and enters an interface between the first side wall and the liquid. The bubble generating unit is configured for generating a bubble that is in contact with an inner surface of the first side wall. The photodetector is configured for detecting light intensity distribution of the monochromatic light through the liquid.

14 Claims, 5 Drawing Sheets

(56) References Cited

U.S. PATENT DOCUMENTS

| | | | | |
|---|---|---|---|---|
| 2015/0211973 A1* | 7/2015 | Friedrich | ............... | G01N 13/02 |
| | | | | 73/64.52 |
| 2019/0242804 A1* | 8/2019 | Alshehri | ................ | G01N 33/24 |
| 2021/0047680 A1* | 2/2021 | Sheng | ............... | B01L 3/502784 |
| 2021/0285860 A1* | 9/2021 | Okada | .................... | G01N 13/02 |

FOREIGN PATENT DOCUMENTS

| | | | | | |
|---|---|---|---|---|---|
| CN | 111239005 A | * | 6/2020 | ............. | G01B 11/28 |
| DE | 3938848 A1 | * | 11/1989 | | |
| WO | WO-2015058927 A1 | * | 4/2015 | ............. | G01B 11/24 |

\* cited by examiner

CONTACT ANGLE MEASURING DEVICE

RELATED APPLICATIONS

The present disclosure claims priority to Chinese Patent Application No. 202110508411.1, filed on May 11, 2021, which is incorporated herein by reference.

TECHNICAL FIELD

The present disclosure belongs to the field of contact angle measurement, in particular, to a contact angle measuring device.

BACKGROUND

The wettability of solid surfaces plays an important role in many fields such as artificial organs and bio-materials. Contact angle is an important method to indirectly measure the wettability of solid surfaces.

At present, most of the measurement of surface contact angle is to analyze the contact angle by taking an image. For example, CN102507390A discloses a method for detecting a static contact angle during hydrophobicity, including: collecting the water drop images, then analyzing; selecting the specified algorithm to analyze the water drop under different conditions; and obtaining the contact angle at last. CN102507391A provides a method for detecting a static contact angle of a droplet during hydrophilicity, including: acquiring a water droplet image; selecting a circle fitting algorithm or an ellipse fitting algorithm to calculate an estimated value of the static contact angle of the droplet; selecting the circle fitting algorithm or the ellipse fitting algorithm to calculate the exact value of the static contact angle of the water droplet according to the volume of the water droplet and the estimated value of the static contact angle of the water droplet.

The vast majority of existing contact angle measurement methods rely on image processing. Due to optical limitations, especially near the three-phase contact line, there will be inherent errors. Although the error of the contact angle can be reduced by increasing the image resolution, this error cannot be completely eliminated and can affect the measurement accuracy.

SUMMARY

The present disclosure is intended to provide a contact angle measuring device to solve the above-mentioned technical problems.

In order to achieve the above object, the technical scheme adopted in the present disclosure is: a contact angle measuring device includes: a light source, a container, a photodetector, a bubble generating unit, and a processing unit; the container comprising a first side wall and a second side wall that are opposite; the first side wall being made of a light-transmitting material, the container being filled with a liquid with light transmission inside; the light source being a monochromatic light source, and monochromatic light emitted by the light source passing through the first side wall and entering an interface between the first side wall and the liquid at a total reflection angle or greater than the total reflection angle; the bubble generating unit being configured for generating a bubble that is in contact with an inner surface of the first side wall, a detection surface of the photodetector being sealed through the second side wall to contact with the liquid, for detecting light intensity distribution of the monochromatic light through the liquid; an output of the photodetector being connected to the processing unit.

In an embodiment, a temperature controller is further included for controlling temperatures of the container and the liquid.

In an embodiment, the temperature controller is performed by a semiconductor cooler.

In an embodiment, the light source is a light emitting diode (LED) light source.

In an embodiment, the photodetector is a planar array complementary metal oxide semiconductor (CMOS) photodetector.

In an embodiment, a pressure controller is further included for adjusting an internal pressure of the container.

In an embodiment, the bubble generating unit comprises a needle and an air source; an air inlet of the needle is in communication with the air source, the needle is sealed through the first side wall, and an air outlet of the needle is provided on an inner side of the first side wall.

In an embodiment, the processing unit is a computer.

In an embodiment, a test bracket is further included, and the light source and the container are fixed on the test bracket.

In an embodiment, the container has a square structure.

Beneficial Technical Effects of the Present Disclosure

The present disclosure can realize the measurement of the contact angle between the light-transmitting liquid and the light-transmitting solid surface, and it can effectively solve the error caused by the calculation of the photographed image and the error caused by the image pixel in the existing contact angle measurement technology. The temperature during the measurement process can be stably maintained, with a high measurement accuracy.

BRIEF DESCRIPTION OF DRAWINGS

In order to illustrate the technical solutions in the embodiments of the present disclosure more clearly, the following briefly introduces the accompanying drawings used in the description of the embodiments. Obviously, the drawings in the following description are only some embodiments of the present disclosure. For those of ordinary skill in the art, other drawings can also be obtained from these drawings without any inventive effort.

DESCRIPTION OF EMBODIMENTS

To further illustrate the various embodiments, the present disclosure is provided with the accompanying drawings. These drawings are a part of the disclosure of the present disclosure, which are mainly used to illustrate the embodiments, and can be used in conjunction with the relevant description of the specification to explain the operation principles of the embodiments. With reference to these contents, one of ordinary skill in the art will understand other possible embodiments and advantages of the present disclosure. Components in the figures are not drawn to scale, and similar component symbols are often used to represent similar components.

The present disclosure will now be further described with reference to the accompanying drawings and specific embodiments.

Figure 1:
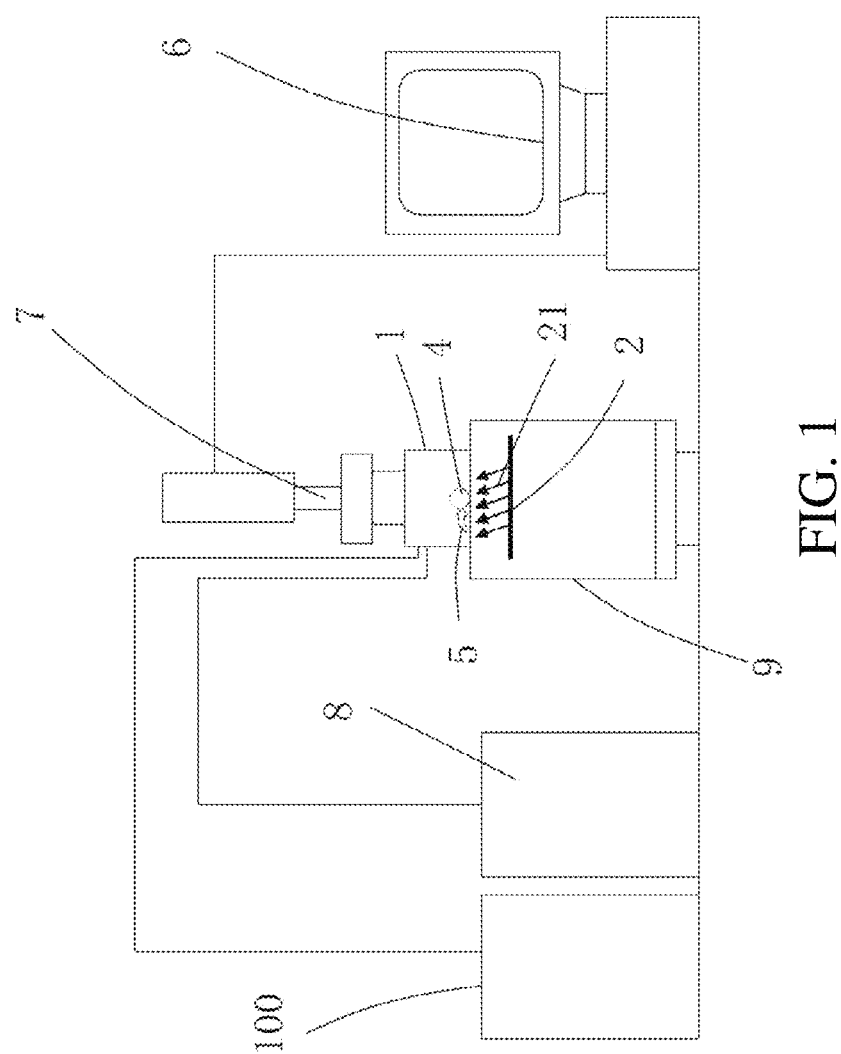
FIG. 1 is a schematic structural diagram of a specific embodiment according to the present disclosure.
Figure 2:
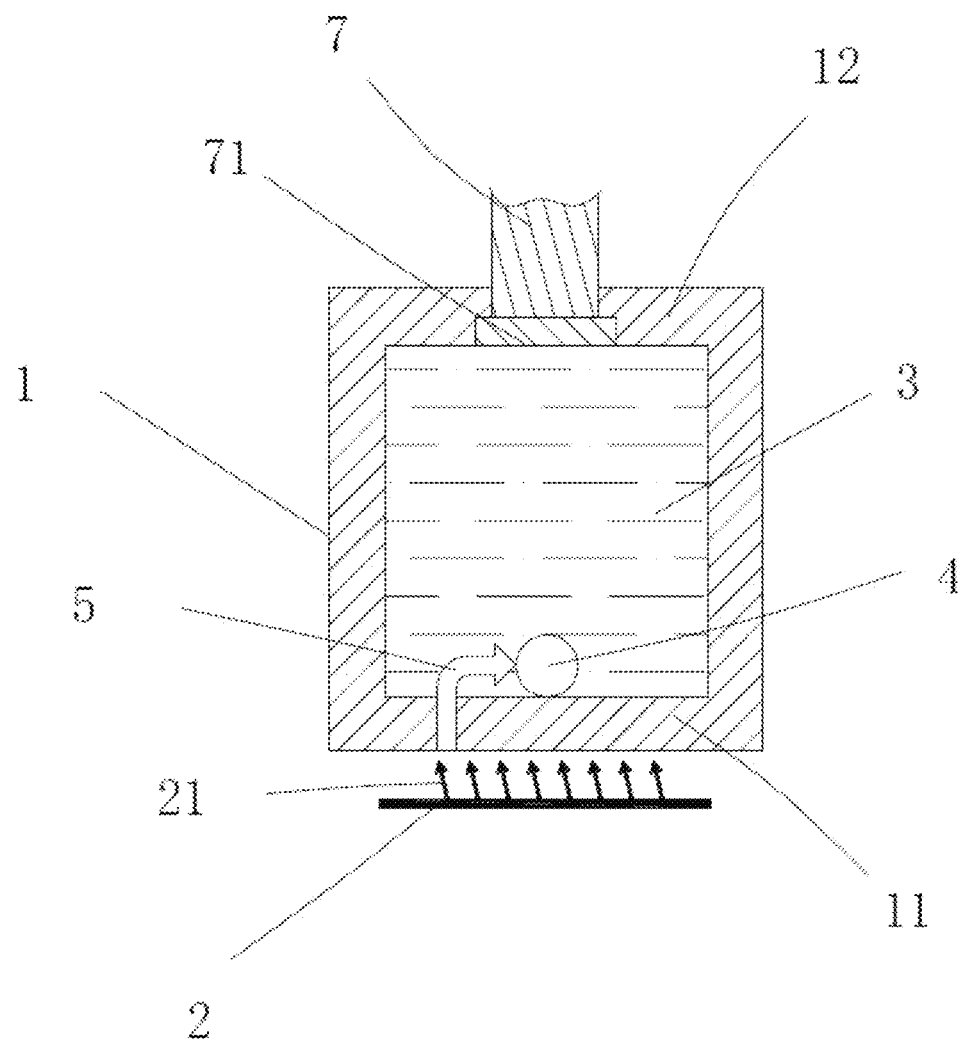
FIG. 2 is a partial structural cross-sectional view of a specific embodiment according to the present disclosure.
Figure 3:
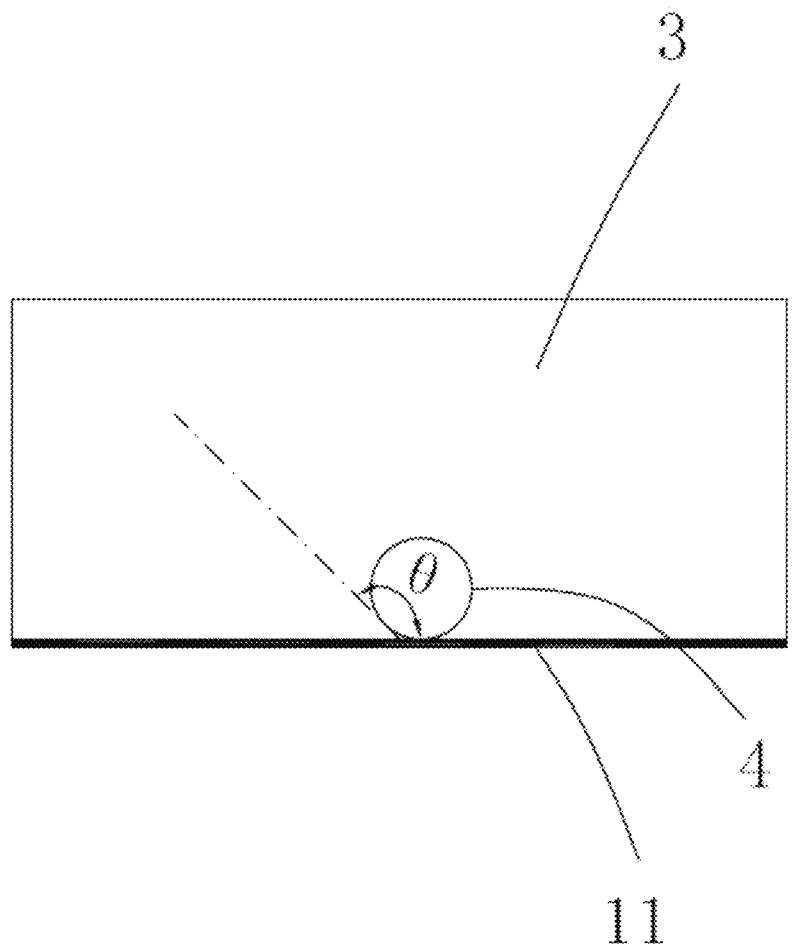
FIG. 3 is a contact angle schematic diagram according to the present disclosure.

As shown in FIGS. 1-3, a contact angle measuring device may include a light source 2, a container 1, a photodetector 7, a bubble generating unit, a processing unit 6, and a temperature controller 100. The container 1 may include a first side wall and a second side wall that are opposite to each other, and the first side wall may be made of a light-transmitting material. In the specific embodiment, the entire container 1 is made of the same light-transmitting material, it is simple to manufacture and easy to implement, but is not limited to this. In other embodiments, alternatively, the first side wall may be made of a light-transmitting material, and the other side walls of the container 1 may be made of an opaque material, so as to avoid interference caused by the projection of external ambient light from the other side walls, and further improve the measurement accuracy.

In the specific embodiment, the container 1 has a square structure, the structure is simple and it is easy to measure and operate, but it is not limited to this. In other embodiments, the container 1 may also have other shapes such as cylindrical and prismatic shapes.

In the specific embodiment, the first side wall and the second side wall may be the lower side wall 11 and the upper side wall 12 respectively (taking FIG. 1 as the direction reference), which is easy to operate, but not limited to this. In other embodiments, the first side wall and the second side wall may also be the upper side wall and the lower side wall, or the left and right side walls, respectively.

The interior of the container 1 may be filled with light-transmitting liquid 3, the light source 2 may be a monochromatic light source, and is provided outside the first side wall 11 of the container 1. In the specific embodiment, the light source 2 may be provided below the lower side wall 11 of the container 1, and the emitted monochromatic light 21 emitted from the light source 2 can pass through the lower side wall 11 and is incident on the interface between the lower side wall 11 and the liquid 3 at a total reflection angle or greater than the total reflection angle. Of course, in other embodiments, the light source 2 can also be embedded inside the lower side wall 11 to make the structure more compact.

In the specific embodiment, the light source 2 is preferably an LED light source, which is easy to implement, low in cost, long in service life, and environmentally friendly, but is not limited to this. In other embodiments, the light source 2 can also use other existing monochromatic light sources.

In the specific embodiment, the light source 2 may be an area light source, and the spot area can cover the entire lower side wall 11, or can only cover a range extending outward with the bubble 4 as the center, thereby reducing the size and cost of the light source 2.

The bubble generating unit is used to generate a bubble 4 in contact with the inner surface of the lower side wall 11, and the bubble 4 may be in contact with the inner surface of the lower side wall 11 irradiated by the monochromatic light 21.

In the specific embodiment, the bubble generating unit may include a needle 5 and an air source (not shown in the figures), the air inlet of the needle 5 is in communication with the air source, and the needle 5 is sealed through the lower side wall 11. The air outlet may be provided inside the lower side wall 11 and is close to the lower side wall 11, such that the bubble 4 generated by the air outlet of the needle 5 will be adsorbed on the inner surface of the lower side wall 11. Of course, in other embodiments, the needle 5 can also pass through other side walls of the container 1, as long as its air outlet is close to the lower side wall 11, such that the bubbles 4 generated by the air outlet of the needle 5 will be adsorbed on the inner surface of the lower side wall 11. The air source can be realized by an air pump or an air cylinder, which can be easily realized by those skilled in the art, and will not be described in detail.

The detection surface 71 of the photodetector 7 may be sealed through the upper side wall 12 and is in contact with the liquid 3, so as to detect the light intensity distribution (including intensity and spatial distribution) of the monochromatic light 21 through the liquid 3. The photodetector 7 may have an output terminal connected to the processing unit 6. Contacting the detection surface 71 of the photodetector 7 with the liquid 3 can prevent the secondary scattered light and secondary refracted light passing through the wall of the container 1 from affecting the light intensity distribution area and further affecting the measurement accuracy.

In the specific embodiment, the detection surface 71 of the photodetector 7 may be embedded in the inner surface of the upper side wall 12 and may be flush with the inner surface of the upper side wall 12, the structure is more compact, and the waterproof setting of the photodetector 7 can be easy, but it is not limited to this.

Preferably, in the embodiment, the photodetector 7 may be a planar array CMOS photodetector, such that it is easy to implement and has low cost, but is not limited to this. In other embodiments, it may also be a planar array charge-coupled device (CCD) photodetector or the like.

The temperature controller 100 may be used to control the temperatures of the container 1 and the liquid 3, to avoid the temperature rise of the lower side wall 11 of the container 1 and the liquid 3 due to the action of the monochromatic light 21 during the measurement process, so as to maintain the stability of the temperature during the measurement process, and to improve the measurement precision. Of course, in some embodiments, the temperature controller 100 may not be provided.

The temperature controller 100 can be implemented by using a semiconductor cooler. When the temperature rises, the temperature controller 100 controls the semiconductor cooler to work to cool it down, so as to keep the temperature stable. The temperature controller 100 may be a very mature existing product, which can be easily realized by those skilled in the art, and will not be described in detail.

In the specific embodiment, the processing unit 6 may be a computer, but it is not limited thereto. In other embodiments, the processing unit 6 may be a mobile phone, an IPAD, or the like.

In the specific embodiment, a test bracket 9 may be also included, and the light source 2 and the container 1 may be fixed on the test bracket 9 to facilitate testing.

Further, in the specific embodiment, a pressure controller 8 may be also included, and the pressure controller 8 is used to adjust the internal pressure of the container 1, so as to measure the contact angle $\theta$ under a constant pressure state, such that the measurement accuracy can be improved. Alternatively, the internal pressure of the container 1 can be changed in real time, such that the contact angle θ can be changed to realize the measurement of the dynamic contact angle θ.

The pressure controller 8 can adopt various pressure controllers in the existing market, those are already very mature existing products and can be easily realized by those skilled in the art, and will not be described in detail.

Figure 4:
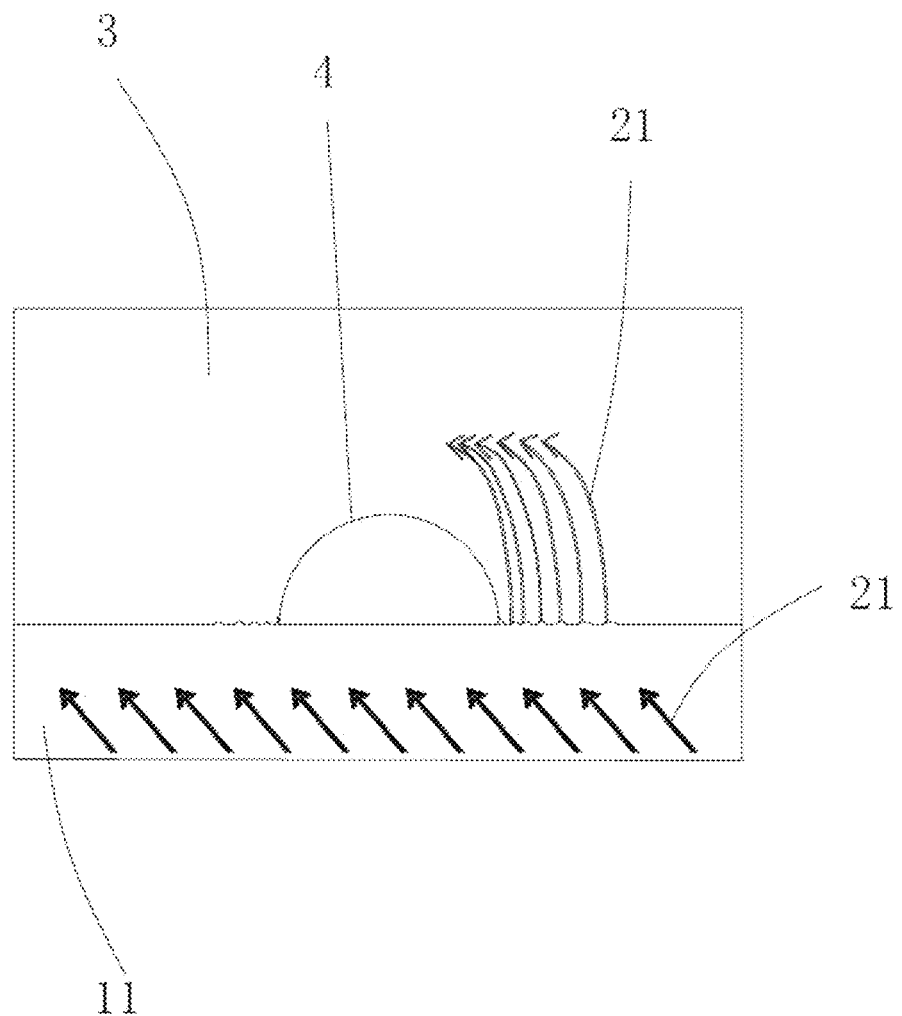
FIG. 4 is a principle schematic diagram of an evanescent wave measurement contact angle according to the present disclosure.
Figure 5:
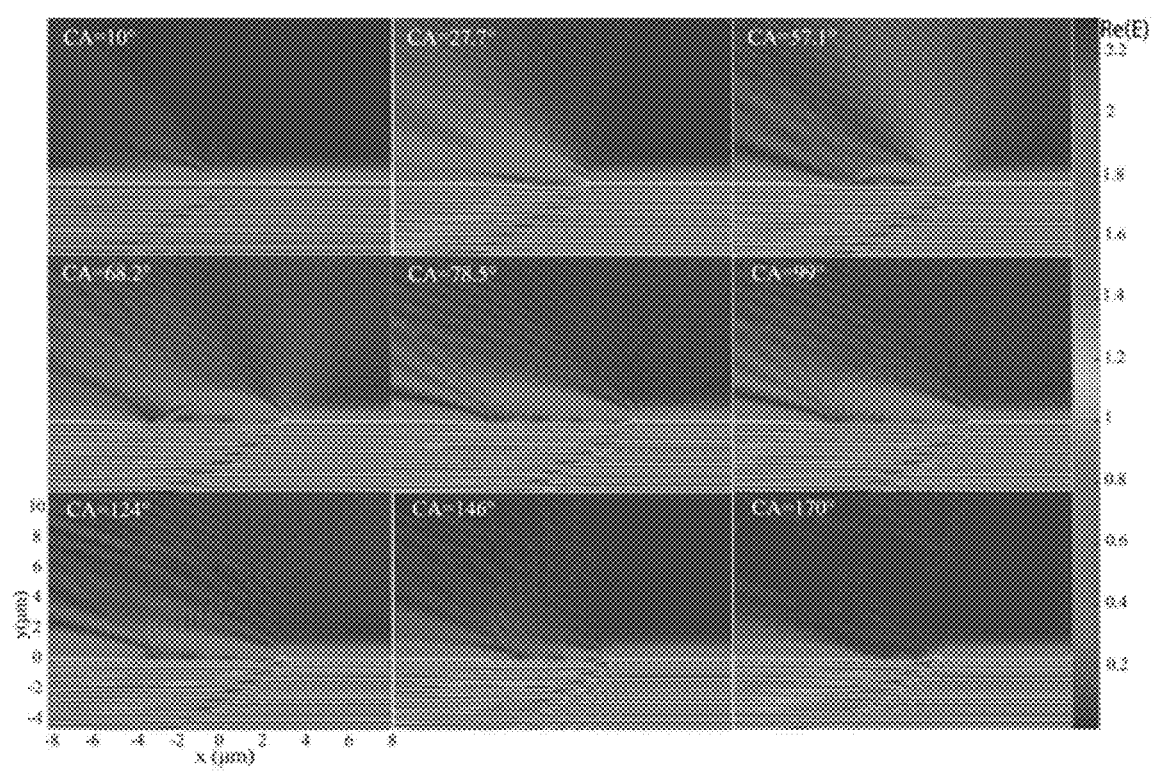
FIG. 5 is a simulation diagram of evanescent wave propagation with different contact angles according to the present disclosure.

Measurement Principle:

If no bubble 4 exists, the monochromatic light 21 is incident to the liquid 3 from the lower side wall 11 of the container 1 at the total reflection angle or greater than the total reflection angle, and will be totally reflected at the interface between the lower side wall 11 and the liquid 3. The monochromatic light 21 cannot enter the liquid 3, and at the same time, the monochromatic light 21 generates an evanescent wave at the interface between the lower side wall 11 and the liquid 3 and propagates along the interface. Therefore, no monochromatic light 21 is transmitted above the liquid 3. However, when bubbles 4 exist, since the bubbles 4 are located at the interface between the lower side wall 11 and the liquid 3, the tension distribution at the edge of the bubbles 4 has a microscopic effect on the tension at the three-state interface of solid-liquid-air, resulting in that the distribution of matter near the three-phase contact line produces changes in the Wiener size, and the refractive index at the intersection of solid and liquid fluctuates. At this time, when the monochromatic light 21 is incident at a total reflection angle, a part of the light will be transmitted through the liquid 3, and the coherence phenomenon will occur above the incident angle, as shown in FIG. 4. Therefore, the photodetector 7 can detect the corresponding light intensity. FIG. 5 simulates the influence of different contact angles θ on the monochromatic light 21: the light source is placed in a glass medium, and it is incident on the water at an angle greater than the total reflection angle, it can be seen that when the contact angle (CA) changes, the electric field distribution above the bubble also changes, and coherence occurs in the glass medium. Therefore, when the contact angles θ are different, the light intensity distributions detected by the photodetector 7 are also different. After the light intensity distributions detected by the photodetector 7 are transmitted to the processing unit 6 for processing, the contact angle θ can be obtained. For example, the influence curve of the contact angle θ on the light intensity can be calibrated in advance, and then the contact angle θ can be deduced through the influence curve, and then the wettability of the solid (container) surface or the tension of the liquid can be known.

When the surface wettability of different light-transmitting solid materials is to be measured, different light-transmitting solid materials may be made into container 1 (or lower side wall 11, and other side walls of container 1 are made of opaque materials), and then the light intensity distribution is detected by photodetector 7 and transmitted to the processing unit 6 for processing, such that the contact angle θ can be obtained, and then the surface wettability of the solid can be obtained.

When the tension of different light-transmitting liquids is to be measured, the liquid to be measured may be poured into the container 1, and then the light intensity distribution is detected by the photodetector 7, and then transmitted to the processing unit 6 for processing, such that the contact angle θ can be obtained, and then the tension of the liquid can be known.

Although the present disclosure has been particularly shown and described in connection with preferred embodiments, it will be understood by those skilled in the art that various changes in form and detail made to the present disclosure without departing from the spirit and scope of the present disclosure as defined by the appended claims all fall within the protection scope of the present disclosure.

What is claimed is:

1. A contact angle measuring device, comprising:
   a light source,
   a container,
   a photodetector,
   a bubble generating unit,
   a test bracket, and
   a processing unit, wherein:
      the container comprises a first side wall and a second side wall that is opposite to the first side wall,
      the first side wall is made of a light-transmitting material,
      the container is filled with liquid that is transmissive to light,
      the light source is a monochromatic light source,
      monochromatic light emitted by the light source passes through the first side wall and enters an interface between the first side wall and the liquid at a total reflection angle or at an angle greater than the total reflection angle,
      the bubble generating unit is configured for generating a bubble that is in contact with an inner surface of the first side wall,
      a detection surface of the photodetector is sealed through the second side wall to contact with the liquid for detecting light intensity distribution of the monochromatic light through the liquid,
      an output of the photodetector is connected to the processing unit,
      the detection surface of the photodetector is embedded in and is flush with an inner surface of the second side wall,
      the bubble generating unit comprises a needle and an air source,
      an air inlet of the needle is in communication with the air source,
      the needle is sealed through the first side wall of the container,
      an air outlet of the needle is provided on an inner side of the first side wall, and
      the light source and the container are fixed on the test bracket.

2. The contact angle measuring device according to claim 1, further comprising a temperature controller configured for controlling temperatures of the container and the liquid.

3. The contact angle measuring device according to claim 2, wherein the temperature controller is a semiconductor cooler.

4. The contact angle measuring device according to claim 3, wherein the light source is a light emitting diode (LED) light source.

5. The contact angle measuring device according to claim 4, wherein the light source is an area light source.

6. The contact angle measuring device according to claim 5, wherein the light source has a light spot area covering an entire surface of the first side wall.

7. The contact angle measuring device according to claim 5, wherein the light source has a light spot area merely covering a range extending outward for a specified distance with the bubble as a center.

8. The contact angle measuring device according to claim 1, wherein the photodetector is a planar array complementary metal oxide semiconductor (CMOS) photodetector.

9. The contact angle measuring device according to claim 1, further comprising a pressure controller configured for adjusting an internal pressure of the container.

10. The contact angle measuring device according to claim 1, wherein the air source is an air pump or an air cylinder.

11. The contact angle measuring device according to claim 1, wherein the processing unit is a computer.

12. The contact angle measuring device according to claim 1, wherein the container has a square structure.

13. The contact angle measuring device according to claim 1, wherein other side walls of the container except the first side wall are made of opaque materials.

14. The contact angle measuring device according to claim 1, wherein an entirety of the container is made of the light-transmitting material.

* * * * *